United States Patent Office 2,780,575
Patented Feb. 5, 1957

2,780,575

POLYCHLORINATED FLUORANTHENE AS A PARASITICIDE

Eugene E. Kenaga, Midland, Mich., assignor to The Dow Chemical Company, Midland, Mich., a corporation of Delaware No Drawing. Application January 13, 1954,
Serial No. 403,899

5 Claims. (Cl. 167—30)

This invention is concerned with parasiticides and is particularly directed to a composition and method for the control of parasitic organisms.

It is an object of the present invention to provide a novel composition adapted to be employed for the control of many common household and agricultural pests. A further object is the provision of an improved method wherein the novel composition is employed for parasite control. An additional object is to provide a composition which is adapted to be applied to the aerial portions of plants for the control of plant pests without substantial injury to the plant foliage. Additional objects will become apparent from the following specification and claims.

In accordance with the present invention, it has been discovered that a chlorinated fluoranthene product having an average chlorine content of about seven chlorine atoms per molecule is an effective parasiticide and is adapted to be employed for the control of a wide range of agricultural and household pests. The chlorinated fluoranthene product is a light yellow, crystalline material which is somewhat soluble in many organic solvents and of very low solubility in water. It is adapted to be readily and conveniently employed for the control of many parasitic organisms and particularly those ordinarily found on the aerial portions of growing plants. It is an advantage of the present invention that compositions containing the compound may be applied to growing vegetation in amounts required for pest control without significant injury to the plant foliage.

In carrying out the method of the present invention, the undesirable pests may be controlled by contacting the organism, its habitat, and/or its food prior to ingestion with a parasiticidal amount of the unmodified fluoranthene product. However, the present method also embraces the employment of a liquid or dust composition containing the toxicant. Such compositions are adapted to be applied to living plants without substantial injury to the foliage thereof. In preparing toxicant compositions, the fluoranthene product may be modified with one or more of a plurality of additaments including aromatic solvents, petroleum distillates, water liquid carriers, surface active dispersing agents and finely divided inert solids. Depending upon the concentration in the composition of the fluoranthene product, such augmented compositions are adapted to be employed for the control of the undesirable parasites or employed as concentrates and subsequently diluted with additional inert carrier to produce the ultimate treating compositions. In the compositions to be employed as concentrates, the toxicant may be present in a concentration of from about 5 to 95 percent by weight.

The exact concentration of the chlorinated fluoranthene product employed in a composition for application to the pest, its habitat or food, may vary provided a parasiticidal dosage of toxicant is supplied either on the organism or its environment, or in its food. This dosage of toxicant is primarily dependent upon the susceptibility of a particular organism to the fluoranthene product. In general, good results are obtained with liquid compositions containing from about 0.01 to 2 percent by weight of toxicant, although compositions containing as high as 90 percent may be employed. With dusts, good results are obtained with compositions containing from 0.1 to 10 percent or more by weight of toxicant. Where the compositions are to be applied to living plants it is preferred that the toxicant be present in an amount not to exceed about 1 percent in liquid compositions and about 5 percent in dusts.

In the preparation of dust compositions, the chlorinated fluoranthene product may be compounded with any of the finely divided solids such as pyrophyllite, diatomaceous earth, gypsum and the like. In such operations, the finely divided carrier is ground or mixed with the toxicant or wet with a solution of the toxicant in a volatile organic solvent. Similarly, dust compositions containing the fluoranthene product may be similarly compounded from various of the solid earth surface active dispersing agents, such as fuller's earth, attapulgite, and other clays. Depending upon the proportions of ingredients, these dust compositions may be employed as concentrates and subsequently diluted with additional solid surface active dispersing agent or with pyrophyllite, diatomaceous earth, gypsum and the like to obtain the desired amount of active ingredient in a composition adapted to be employed for the control of pests. Also, such concentrate dust compositions may be dispersed in water, with or without the aid of dispersing agents, to form spray mixtures.

Further, the fluoranthene product or a dust concentrate composition containing such product may be incorporated in intimate mixture with surface active dispersing agents such as ionic and non-ionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

Similarly, the fluoranthene product may be compounded with a suitable water-immiscible organic liquid and surface active dispersing agent to produce emulsifiable liquid concentrates which may be further diluted with water and oil to form spray mixtures in the form of oil-in-water emulsions. In such compositions, the carrier comprises an aqueous emulsion, i. e. a mixture of water-immiscible solvent, emulsifying agent and water. Preferred dispersing agents to be employed in these compositions are oil-soluble and include the non-ionic emulsifiers such as the condensation product of alkylene oxide with phenols and organic acids, polyoxyethylene derivatives of sorbitan esters, complex ether alcohols and the like. However, oil soluble ionic emulsifying agents such as mahogany soaps may also be used. Suitable organic liquids to be employed in the compositions include petroleum oils and distillates, toluene, liquid halohydrocarbons and synthetic organic oils.

When operating in accordance with the present invention, the chlorinated fluoranthene product or a composition containing the toxicant may be applied to the pests to be controlled, to their habitat or to their food in any convenient fashion, e. g. by means of hand dusters or sprayers or by simple mixing with the food to be ingested by the organisms. Applications to the foliage of plants conveniently may be carried out with power dusters, boom sprayers and spray dusters. In such foliar application, the employed compositions should not contain any appreciable amounts of any phytotoxic diluents. In large scale operations, dusts or low-volume sprays may be applied from an airplane.

The chlorinated fluoranthene product as employed in accordance with the present invention may be prepared by subjecting fluoranthene to the action of an excess of liquid chlorine (at a temperature at or below −33.7° C.) while exposing the mixture to diffused daylight at an intensity of less than 85 foot-candles. The proportion of the desired product becomes smaller as the light intensity is increased and the practical limit is near 85 foot-candles, with intensities of from 1 to 50 foot-candles being preferred. The reaction may be controlled by adding the fluoranthene dropwise or in successive small portions to the liquid chlorine. The reaction takes place readily, and, when the fluoranthene has all been added, the reaction mixture may be warmed gently to evaporate or distill the remaining chlorine. Final traces of chlorine may be withdrawn under reduced pressure. The residue is the chlorinated fluoranthene product having an average chlorine content of about seven chlorine atoms per molecule.

While the reaction is most conveniently carried out at atmospheric pressure and at a temperature below the atmospheric boiling point of chlorine, it may be effected under superatmospheric pressure sufficient to keep the chlorine liquefied at temperatures at or below −20° C.

In a representative operation, 0.495 mole (100 grams) of fluoranthene was added dropwise in the course of about one hour to an excess of liquid chlorine in a wide-mouth Dewar jar, the mouth of which was covered with a watchglass between additions of fluoranthene. During the reaction, the temperature of the vessel and contents was below −20° C. and the reaction mixture was exposed to diffused sunlight, the intensity of which at the mouth of the jar was from 40 to 85 foot-candles throughout the reaction. Following the addition, the excess chlorine was allowed to evaporate. The product weighed 232 grams and had an average chlorine content of 55.3 percent, or about 6.7 atoms per mole.

The following examples illustrate the invention but are not to be construed as limiting:

*Example 1*

Twenty-five parts by weight of a chlorinated fluoranthene product having an average chlorine content of 7.1 chlorine atoms per molecule, 65 parts of xylene and 10 parts of an alkylated aryl polyether alcohol are mechanically mixed to prepare an emulsifiable concentrate composition.

In a similar manner, 90 parts by weight of a fluoranthene produce having an average chlorine content of 6.9 chlorine atoms per molecule, and 10 parts by weight of a sorbitan monolaurate polyoxyethylene derivative (Tween 20) are mixed to prepare a water-dispersible concentrate composition.

Also, 25 parts by weight of a fluoranthene product having an average chlorine content of 6.7 atoms per molecule, 10 parts of diatomaceous earth, 2 parts of an alkyl aryl sulfonate (Nacconol NR) and 1 part of a polymerized sodium salt of substituted benzoid alkyl sulfonic acids (Daxad No. 27) are mechanically mixed and ground together to prepare a concentrate composition in the form of a wettable powder.

These concentrate compositions may be dispersed in water to provide aqueous compositions which have very desirable wetting properties. The latter aqueous compositions may be applied to undesirable pests or their habitats and food for the control of the organisms.

*Example 2*

An aqueous spray composition containing 3 pounds of the chlorinated fluoranthene product per 100 gallons is prepared by ballmilling together 0.72 part by weight of chlorinated fluoranthene (having an average chlorine content of 6.7 chlorine atoms per molecule), 0.06 part of Nacconol NR, 0.06 part of Daxad No. 27 and 200 parts of water. This spray composition is applied to mature cranberry bean plants which are heavily infested with two-spotted spider mites. At the end of 72 hours, the plants are examined and a 100 percent kill of two-spotted spider mites observed.

*Example 3*

The aqueous spray composition of Example 2 is employed for the control of Mexican bean beetles on mature cranberry bean plants. In such operations, the spray composition is applied to the bean foliage, the leaf surfaces allowed to dry and the plants then infested with a known number of insect larvae. One week after infestation, the plants are examined to ascertain the percent control of the pest. The examination indicates a 100 percent kill of Mexican bean beetles.

*Example 4*

In a further operation, 0.03 part by weight of the chlorinated fluoranthene product (having an average chlorine content of 6.7 chlorine atoms per molecule), 0.06 part of Nacconol NR, 0.06 part of Daxad No. 27 and 200 parts of water are ballmilled together to prepare an aqueous spray composition containing 0.12 pound of toxicant per 100 gallons. This spray composition is employed for the control of Southern army worms on cranberry bean plants. In such operations the foliage of the bean plants is wet with the composition, the leaf surface allowed to dry and the plants then infested with a known number of insect larvae. One week after the infestation, the plants are examined and a 90 percent kill of southern army worms observed.

*Example 5*

The emulsifiable concentrate composition of Example 1 is dispersed in water to prepare an aqueous spray composition containing 1 pound of toxicant per 100 gallons of ultimate mixture. This composition is employed as described in Example 4 for the control of southern army worms on mature cranberry bean plants. As a result of these operations there is obtained a 100 percent kill of southern army worms.

The expression "surface active dispersing agent" as herein employed is intended to include all agents which are capable of acting at the interfacial surface between the chlorinated fluoranthene product and water as the dispersion medium, so as to facilitate the dispersion of the fluoranthene product in water. Thus, the term is inclusive of the solid emulsifying agents such as finely divided aluminum hydroxide and finely divided fuller's earth, attapulgite and other clays, as well as the ionic and nonionic wetting and emulsifying agents such as the alkaline earth metal caseinates, alkyl aryl sulfonates, sulfonated oils, complex organic ester derivatives, complex ether alcohols, and the like.

The term "finely divided inert solid" as herein employed refers to materials which are incapable of facilitating the dispersion of the water-immiscible fluoranthene product in water as the dispersion medium and is intended to include finely divided materials such as pyrophyllite, diatomaceous earth, gypsum and the like.

I claim:

1. A composition comprising an inert parasiticide carrier in admixture with a chlorine addition derivative of fluoranthene having an average chlorine content of from 6.7 to 7.1 chlorine atoms per mole and prepared by mixing fluoranthene with an excess of liquid chlorine at a temperature below −20° C. and under sufficient pressure to keep the chlorine liquified, while exposing the mixture to diffused daylight at an intensity not to exceed 85 foot-candles.

2. A composition claimed in claim 1 wherein the fluoranthene derivative is present in the amount of at least 0.01 percent by weight.

3. A composition claimed in claim 2 wherein the inert parasiticide carrier is a liquid solution of a surface active dispersing agent.

4. A concentrate composition comprising a surface active dispersing agent in intimate admixture with a chlorine addition derivative of fluoroanthene having an average chlorine content of from 6.7 to 7.1 chlorine atoms per mole, and prepared by mixing fluoranthene with an excess of liquid chlorine at a temperature below −20° C. and under sufficient pressure to keep the chlorine liquified, while exposing the mixture to diffused daylight at an intensity not to exceed 85 foot-candles, the fluoranthene derivative being present in the composition in the amount of from 5 to 95 percent by weight.

5. A method which comprises applying to insects and their habitats and food a parasiticidal amount of a chlorine addition derivative of fluoranthene having an average chlorine content of from 6.7 to 7.1 chlorine atoms per mole and prepared by mixing fluoranthene with an excess of liquid chlorine at a temperature below −20° C. and under sufficient pressure to keep the chlorine liquified, while exposing the mixture to diffused daylight at an intensity not to exceed 85 foot-candles.

References Cited in the file of this patent

UNITED STATES PATENTS 2,635,979    Lidov ------------------ Apr. 21, 1953

OTHER REFERENCES

Chemical Abstracts, vol. 36: 516$^3$.